Jan. 4, 1966    L. L. VON GUNTEN    3,227,027
PIANO HAVING ELECTRICALLY CONTROLLED NOTE SUSTAINING MEANS
Filed Nov. 12, 1963    6 Sheets-Sheet 1

INVENTOR.
LEE L. VON GUNTEN
BY
Oldham & Oldham
ATTYS.

Jan. 4, 1966 L. L. VON GUNTEN 3,227,027
PIANO HAVING ELECTRICALLY CONTROLLED NOTE SUSTAINING MEANS
Filed Nov. 12, 1963 6 Sheets-Sheet 2
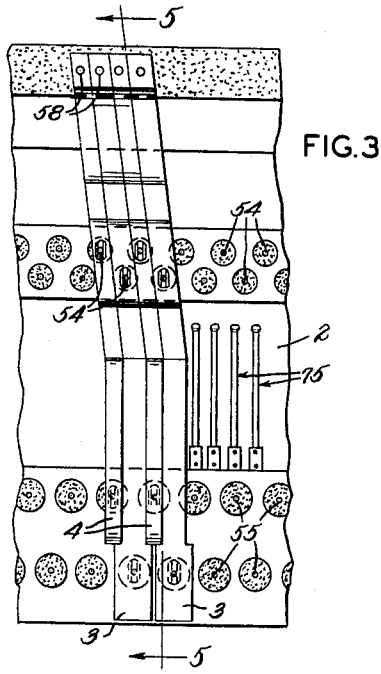
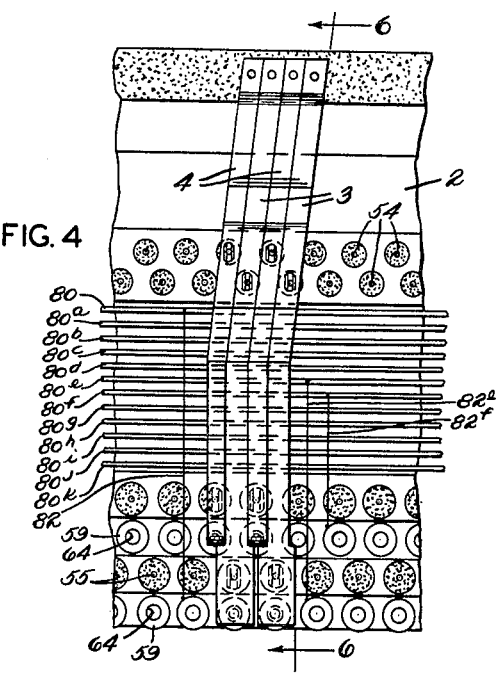
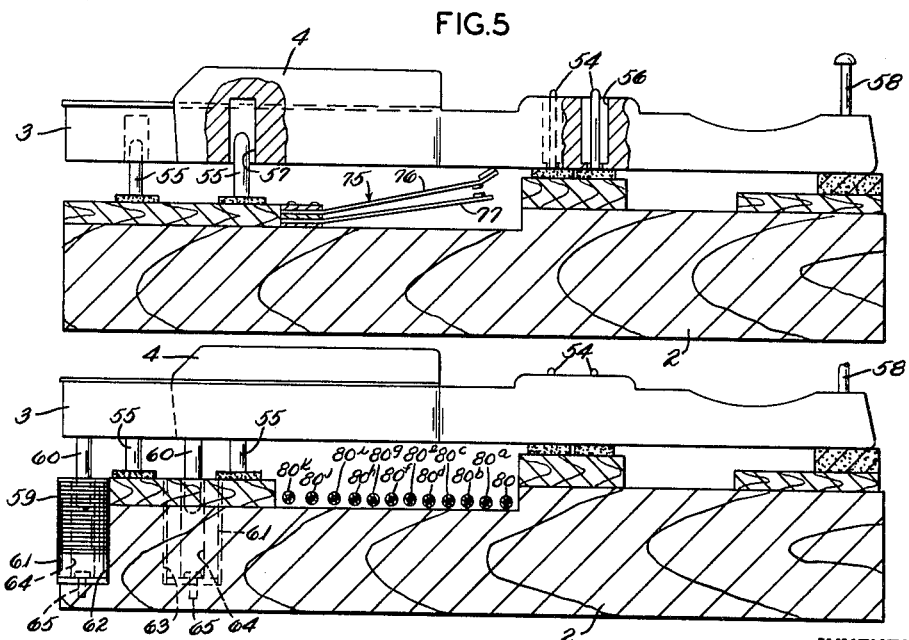
INVENTOR.
LEE L. VON GUNTEN
BY
Oldham & Oldham
ATTYS.

Jan. 4, 1966   L. L. VON GUNTEN   3,227,027
PIANO HAVING ELECTRICALLY CONTROLLED NOTE SUSTAINING MEANS
Filed Nov. 12, 1963   6 Sheets-Sheet 3
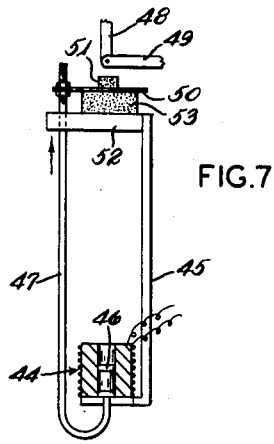
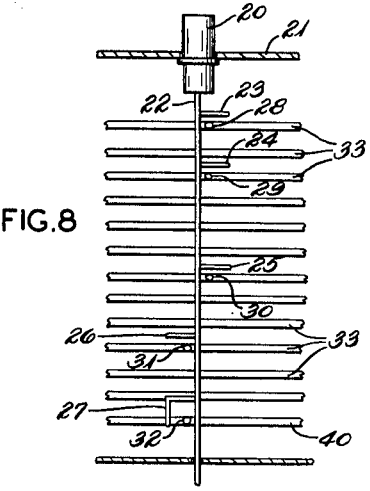
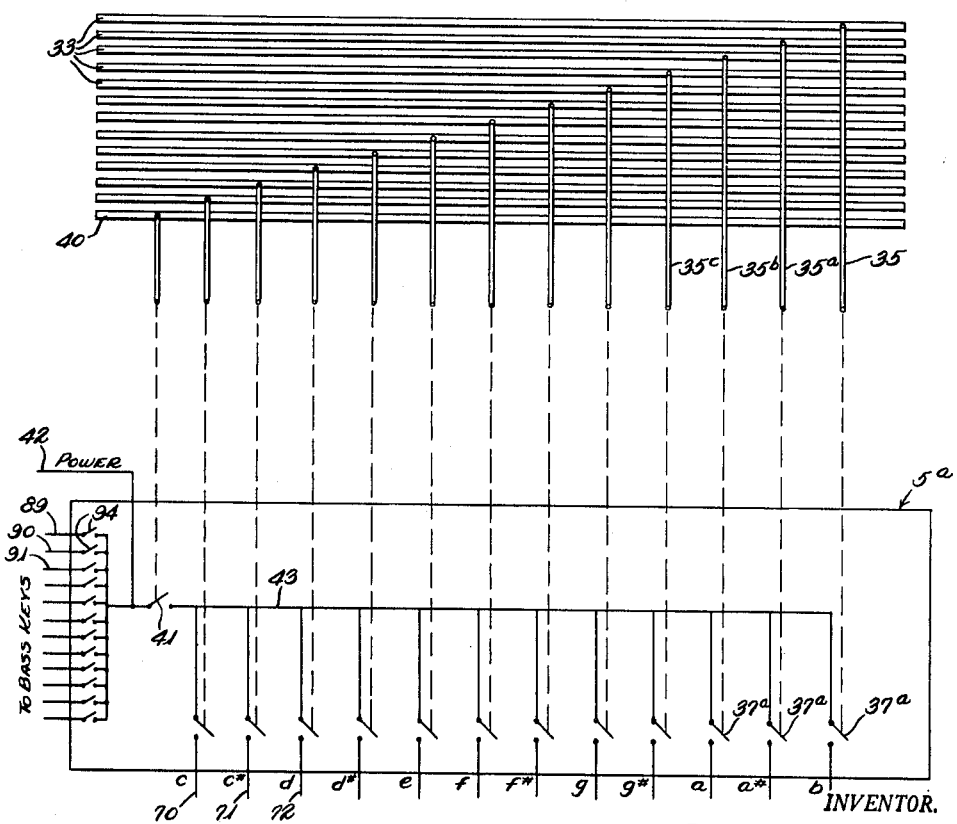
INVENTOR.
LEE L. VON GUNTEN
BY
Oldham & Oldham
ATTYS.

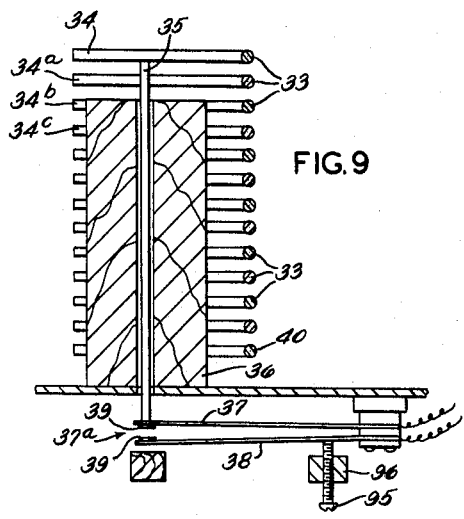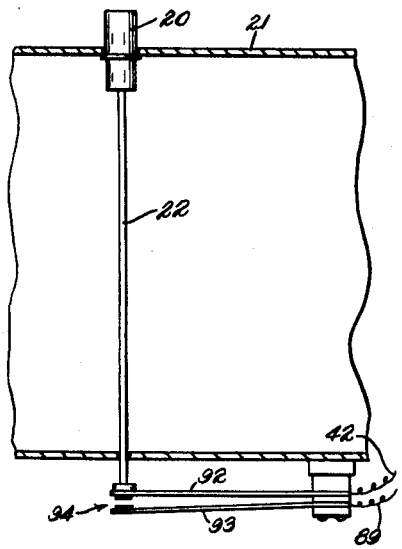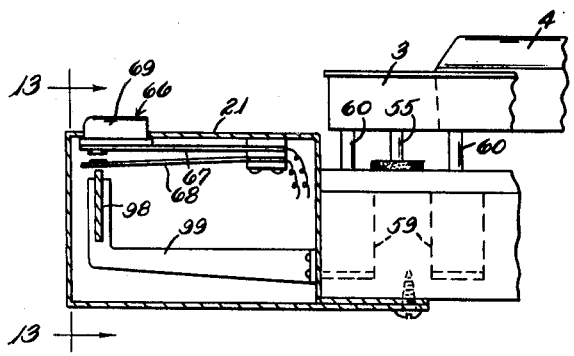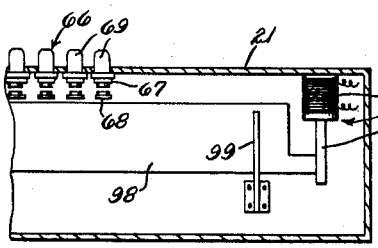

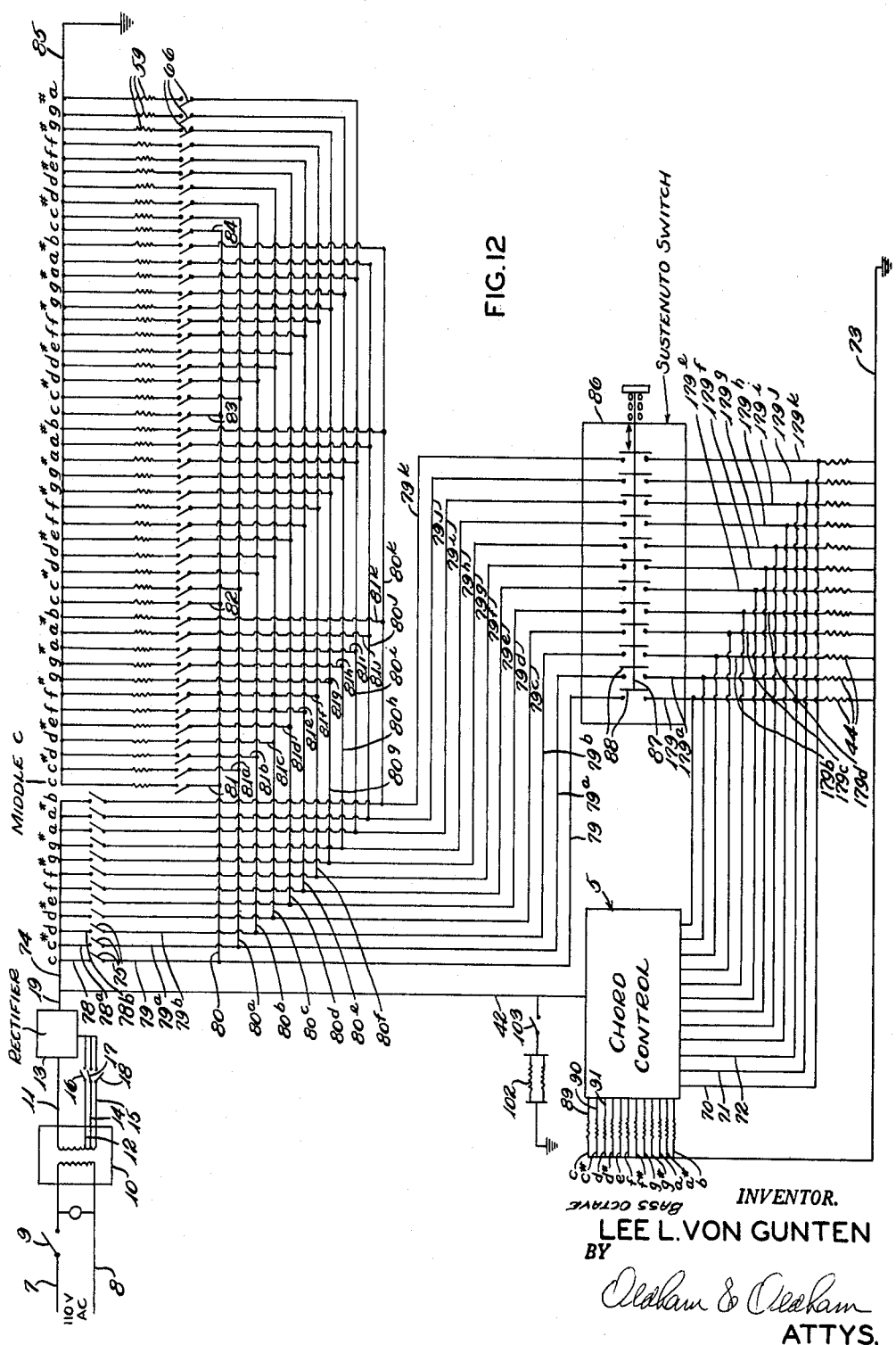

Jan. 4, 1966  L. L. VON GUNTEN  3,227,027
PIANO HAVING ELECTRICALLY CONTROLLED NOTE SUSTAINING MEANS
Filed Nov. 12, 1963  6 Sheets-Sheet 6
FIG.15
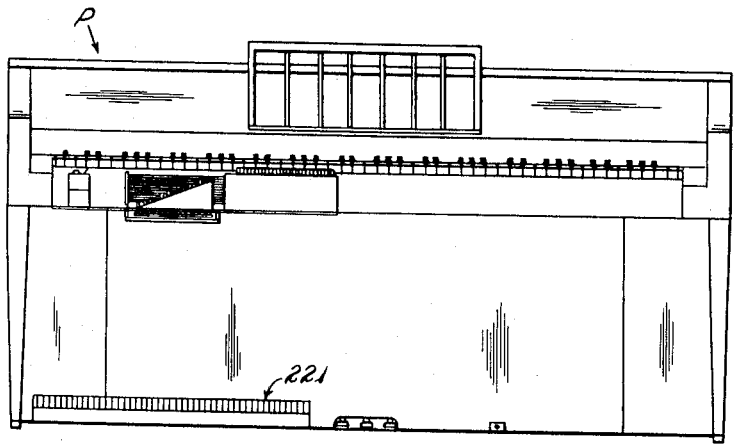
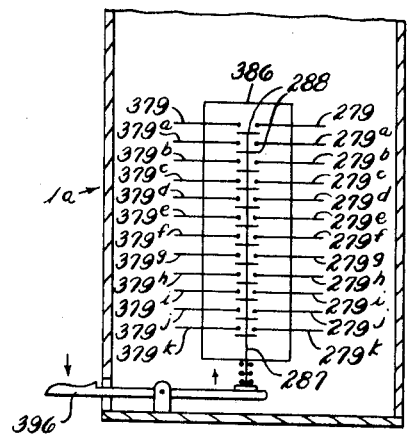
FIG.16
INVENTOR.
LEE L. VON GUNTEN
BY
Oldham & Oldham
ATTYS.

3,227,027
PIANO HAVING ELECTRICALLY CONTROLLED
NOTE SUSTAINING MEANS
Lee L. Von Gunten, Buffalo, N.Y., assignor to The Seeburg Corporation, Chicago, Ill., a corporation of Delaware
Filed Nov. 12, 1963, Ser. No. 323,548
5 Claims. (Cl. 84—245)

This application is a continuation-in-part of my application Serial No. 794,902, filed February 24, 1959, now Patent No. 3,149,528.

The present invention relates to pianos, and especially to pianos having electric playing means associated therewith whereby chords and runs can be played on the piano by the aid of electrically actuated members permanently built into the piano.

Heretofore there have been some efforts made to provide electrically actuated means to provide or play chords in a piano, and examples of such patents are the disclosures found in U.S. Patent No. 2,250,522 and U.S. Patent No. 2,645,968. Yet other inventors have endeavored to provide mechanism in a piano to facilitate the playing of runs thereon, and one disclosure of such mechanism is that found in Klein Patent No. 1,665,593. While such Klein patent was granted in 1928, no commercial use of any real extent has been made of the teachings of such patent insofar as I am aware. In all events, even though some work has been done heretofore in the field of electrically actuated pianos, it is believed that such prior structures and teachings have been objectionable inasmuch as they have involved the use of costly control circuits, or cumbersome and bulky members used in association with the piano to provide the electrical actuation of the keys on the piano, or they have been otherwise objectionable. Furthermore, it is believed that the field of development relating to the electrically actuating of keys in a piano has been relatively inactive and that the closest developments recently have related to electrically powered and actuated organs.

Other work has been performed recently to provide electric organs with chord playing attachments, but the application of electrical playing means to conventional pianos for improved and simplified action thereof has not been satisfactorily solved, insofar as I am aware.

The general object of the present invention is to provide a novel and improved piano having electric playing means built thereinto whereby means are provided in the piano for electrically playing chords and for aiding in the producing of runs on a piano in harmony with a played chord, all without interfering with the normal manual playing or functioning of a given piano.

Another object of the invention is to provide a novel piano that is easy to play and that does not require the player to read the notes of the base staff and usually played by the left hand of the player.

Another object of the invention is to provide a piano which has electric key playing means therein and which is characterized by the relative simplicity of the controls and means present to play both chords and runs or arpeggios on the piano.

Another object of the invention is to provide electrically operated and/or actuated means on a piano that enable a person knowing some fundamentals of music to perform substantially as well or better than an accomplished musician can perform on a conventional piano.

Yet a further object of the invention is to provide a novel and unique harp-like sound and note sequence from a piano by use of certain manually and electrically operated means in association therewith.

Another object of the invention is to sustain a chord on the piano electrically to free both hands of a person playing the piano to permit two hand arpeggios on the piano.

Another object of the invention is to provide a relatively compact, inexpensive solenoid coil and solenoid armature on a piano by use of standard piano parts having a minimum of addition and/or change thereto.

Another object of the invention is to provide an electrically actuated piano having individually or jointly usable chord and run playing mechanism associated therewith and where a minimum amount of wiring is provided for the electrically actuated means in the piano.

Other objects of the invention are to provide an accordion-type mechanical chord playing keyboard in association with solenoids at the keys of a piano for playing the keys; to provide a single contact member that closes a power supply for the chord playing mechanism for actuation of each and every chord controlled by the mechanism by one chord closing contact; to provide a plurality of solenoids positioned below and spaced from certain keys of a piano and where such solenoids have long connector members extending from the armatures of the solenoids to points adjacent portions of the piano action for different keys of the piano whereby energization of a given solenoid will result in the striking of a given key; to provide certain solenoid armatures and solenoid coils in immediate association with and below the piano keys on the piano keyboard with the solenoid coil being adjustable with relation to the solenoid armature for actuation of given keys when desired; to provide circuit controlling power supply switches directly under certain keys of a keyboard for energizing predetermined electrical circuit means when such keys are played either manually or by remotely positioned or other solenoid means provided therefor; to set up a longitudinally aligned series of contacts adjacent certain of the piano keys whereby such keys can be electrically played by closing the contacts in sequence with each other; to provide means to play runs in harmony with a given chord played either manually or electrically on a piano and with the aligned series of contacts being included in the means and with some contacts connecting to dead circuits whereby only desired harmonics are produced in the run; to provide means in a piano to couple together several octaves whereby a note or chord played in a control octave has an equivalent note or chord automatically played in another octave, or octaves; to provide 12 leads extending longitudinally of a piano keyboard for connecting to corresponding keys in different octaves of a piano for energization thereof for run playing purposes; to use solenoids that are silent in action and wear proof for actuation of piano keys; to provide a means in the piano for holding a given chord energized over a period of time even though the keys thereof are manually released whereby both hands of the player playing the piano are available for strumming or closing the aligned contact means for producing unusual chord, run and/or arpeggios effects on the piano; and to provide a convenient control for changing the volume of notes produced on the piano.

The foregoing and other objects and advantages of the invention will be made more apparent as the specification proceeds.

Reference now is particularly directed to the accompanying drawings wherein one currently preferred embodiment of the principles of the present invention is shown, and wherein:

FIG. 1 is a top plan of a piano of the invention;
FIG. 2 is a front elevation of the piano of FIG. 1 with a portion of the cover thereon removed;
FIG. 3 is an enlarged fragmentary plan of a portion of a keyboard of the piano with a number of the keys in position but with other keys being removed;

FIG. 4 is a fragmentary plan similar to FIG. 3 but of a different portion of the piano in the run playing section thereof;

FIGS. 5 and 6 are fragmentary vertical sections taken on lines 5—5 of FIG. 3 and 6—6 of FIG. 4, respectively;

FIG. 7 is a fragmentary vertical section through one of the solenoids and associated means in the chord playing section of the piano;

FIG. 8 is an elevation, partially shown in vertical section, of one chord playing button of the chord playing mechanism of the piano of FIG. 1, and with all other members therein omitted;

FIG. 9 is an enlarged fragmentary vertical section taken on line 9—9 of FIG. 1 of the chord-playing mechanism of the piano;

FIG. 10 is a fragmentary vertical section taken on line 10—10 of FIG. 1;

FIG. 11 is a semi-schematic view of the chord playing mechanism and controls of the invention;

FIG. 12 is a wiring diagram of the electric control means in the piano of the invention;

FIG. 13 is a vertical section taken on line 13—13 of FIG. 10;

FIG. 14 is a vertical section of the chord playing mechanism with only one base key shown therein and other parts all omitted;

FIG. 15 is an elevation of a modified piano of the invention and showing the run playing mechanism in a separate structure on the floor by the piano; and FIG. 16 is a fragmentary vertical section of a modified piano showing a foot control pedal controlling the sostenuto switch.

When referring to corresponding members shown in the drawings and referred to in the specification, corresponding numerals are used to facilitate comparison therebetween such equivalent members.

When referring to a solenoid in the present application, the word is broadly used and normally means both the solenoid coil and the solenoid armature or plunger operatively associated with the solenoid coil for producing some desired action. When individual portions of the solenoid are meant, they will be specifically referred to as a solenoid coil, or a solenoid plunger. Also, when referring to the playing of a piano key in this application, such playing is effected by depressing or striking the piano key and the word or term "playing" is broadly used to cover the action of the depressing, striking, or otherwise causing a given piano key to be depressed to sound the note or string controlled thereby.

The present invention covers several combinations and sub-combinations of means for use in combination with a piano for electrical actuation or playing thereof and one phase of the invention relates to the combination with a piano of a plurality of individual solenoids for each key of several octaves in the piano and with one octave being considered a control octave. Electric power supply means are present in the combination, and means are provided for playing different chords on the piano in the control octave thereof and which means are connected to the solenoids and to the power supply means; circuit means are operatively associated with the keys in the control octave and connect to the power supply means to provide power to solenoids for keys in the other octaves which keys represent those in harmony with an actuated key or chord in the control octave, a plurality of power circuits individually connect to the solenoids for keys in the other octaves, and individual switches are present in the power circuit to close them and operate only the keys in the said other octaves in harmony with a given chord even though any or all of said individual switches may be closed. Another important phase of the present invention relates to the combination with a piano of means connected in parallel with the chord playing means and also connected to the solenoids and to the power supply means for retaining the keys of a played chord in the control octave depressed, and which last-named means include a multi-contact unitary control switch for all of the solenoids in the control octave.

Figure 1:
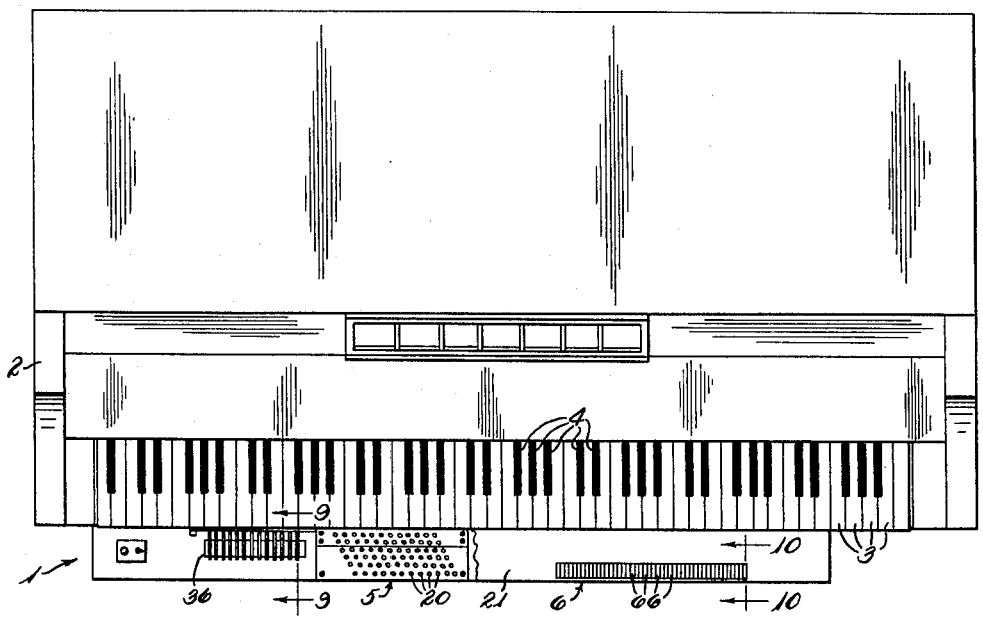
Figure 2:
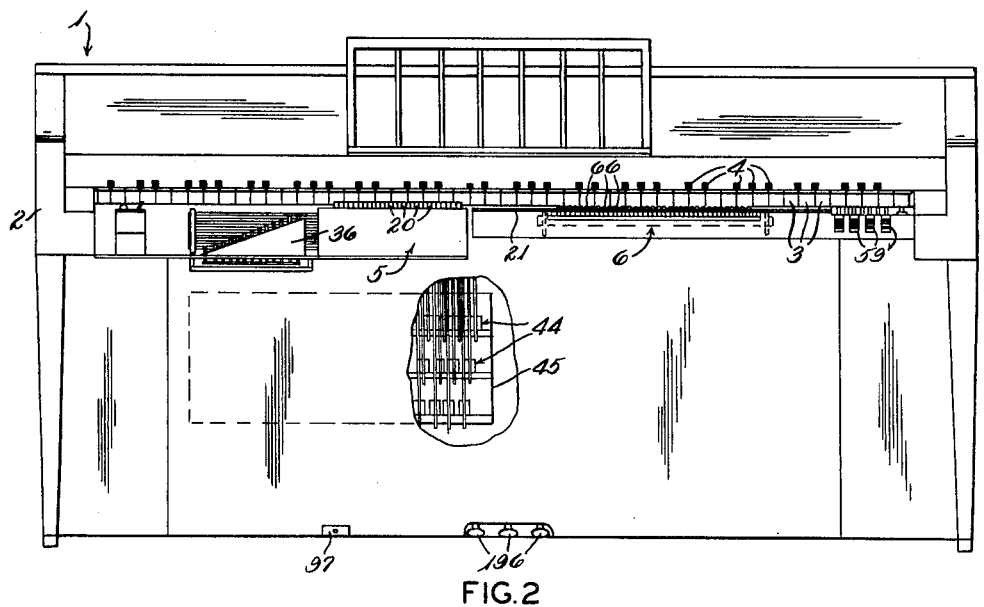

Attention is particularly directed to the details of the structure shown in the drawings, and a piano embodying the principles of the invention is illustrated as a whole by the numeral 1. The piano 1 has a conventional piano frame 2 provided therefor and any conventional number of white keys 3 and black keys 4 may be provided in the piano 1, with the conventional 88 key piano being illustrated. The white keys 3 and black keys 4 and associated members form note playing means in the piano. The piano 1 has certain means associated therewith for either electrically and/or mechanically playing or for facilitating the playing of the piano by the person performing on the piano at any given time. Two general or broad types of controls are provided on the piano 1 and they comprise a chord playing member 5 and a run or arpeggio playing unit or member 6. FIGS. 1 and 2 of the drawings best bring out the fact that the chord playing member 5 and run playing unit 6 are attached to and protrude only a short distance forwardly from the upper front of the frame 2 of the piano 1.

*Power supply*

To provide power to the piano 1 to aid in the playing thereof, conventional leads 7 and 8, FIG. 12, connect to a standard 110 volt A.C. power supply, and a control switch 9 is present in one of these leads for control of power supply to the piano. It is desirable to use relatively low voltages in the actuation of the piano 1 and thus a transformer 10 is connected to the leads 7 and 8 and reduced voltage power supply is then available through secondary leads 11 and 12 of the transformer 10. Normally it is desirable to use direct current in actuation of various solenoids used in the piano 1 of the invention and thus I have provided a conventional rectifier, such as a selenium late rectifier 13, that has the leads 11 and 12 connecting thereto. Alternating current may be used, especially if only more or less instantaneous actuation of the solenoids is used in the piano. A plurality of output leads 14 and 15 also extend from the transformer 10 with the voltage between the leads 12, 14 and 15 being variable so that individual switches 16, 17 and 18, respectively, provided in these leads can be closed to supply voltage at a desired value to the rectifier 13. A pulsating D.C. power supply is thereby furnished from the rectifier 13 by an output lead 19 extending therefrom. The variable voltage so produced controls the force of actuation exerted by a solenoid 44 on the corresponding piano action means, such as on the whip 49 shown in FIG. 7.

*Chord control member*

In practice of this invention, a substantially conventional chord control member or mechanism 5 is provided and the mechanism used is similar to those of accordions, for example, and by which a mechanical button or control can close power circuits to predetermined keys of a selected control octave on the piano to play or sound such selected keys as are in harmony with each other. The control octave usually ends on the key B next to middle C of the piano. One conventional type of control and chord playing unit or means such as could be used in the piano of the invention, is shown in U.S. Patent No. 2,084,266. The chord control member 5 also preferably has buttons therein for playing any desired bass notes, or chords in octaves lower than the control octave.

Some details of portions of this accordion-like chord control mechanism are best shown in FIGS. 8, 9 and 11, and the remainder thereof is of conventional construction. A plurality of individual control buttons 20 are present and are received in and partially positioned by apertures noids 44, a solenoid can be positioned immediately below a link 49 for the key to be controlled even though the solenoids 44 are of relatively heavy duty, sizable construction and can be safely energized for extended periods without overheating. The center line of the solenoids 44 coincides with that of the link 48 and minimizes wear.

Certain details showing the positioning of the white keys 3 and black keys 4 in the piano 1 in accordance with conventional piano building practice are shown in the drawings, such as in FIGS. 3 and 5. These figures indicate how the keys are positioned on conventional means including center pivot pins 54 and end pivot pins 55 which pivot pins 54 and guide pins 55 are adapted to seat in corresponding recesses or slots 56 and 57, respectively, provided in each of the piano keys so that the keys are positioned for playing the associated conventional piano action means (not shown) that are engaged by a screw 58 secured to each of the piano keys at the inner end thereof when the keys are individually depressed or played in the piano.

*Run playing mechanism*

The run playing mechanism or unit 6 in the piano 1 of the invention is provided for actuating the keys to be played by electrical means whereas the actual control means in the form of individual switch means, as hereinafter described in detail, are manually played so that the actual playing of the present piano is a combination of manual and electrical actuations in nearly all instances.

The piano action used in the piano 1 is of a conventional construction, one example of which is shown in U.S. Patent No. 2,073,463.

In each of several octaves on the piano individual solenoid means are provided for actuation of such keys by use of individually manually closed switches associated with and connected in circuit with the solenoids for playing or actuation of such keys, specifically to play notes or strings that are in harmony with a chord played on the control octave of the piano 1, all as hereinafter described in more detail. To this end, individual solenoids each including a solenoid coil 59 and an armature 60 are associated with each of these keys in the run octaves of the piano 1 and the armature 60 is directly secured to a key. Hence as the individual solenoid is energized, the armature 60, which extends downwardly from one of the keys 3 or 4 on the piano 1 in the octaves with which the run playing mechanism is associated, is sharply pulled into the solenoid coil so that the key to which such armature 60 is secured is played. The actual wire in the solenoid coil 59 is wound upon a substantially conventional insulation form or cylinder 61 received in a suitable recess 62 or 63 provided in the frame 2 immediately below each of the keys. The recesses 62 are in the upper front portion of the frame 2 for receiving solenoid coils therein for engaging the armature 60 secured to the white keys of the piano, whereas the black keys have recesses 63 provided therebelow spaced from the front portion of the frame 2 for receiving the solenoid coil 59 therein.

It should be noted that the bores 64 in the cylinder 61 are appreciably larger in diameter than the outer diameter of the armature 60 so that slight arcuate movement of the armature 60 is permitted within the bore 64 because of the pivotal action of the key to which the solenoid armature 60 is secured, when played. It also should be noted, as a minor feature of the present invention, that the solenoid forms 61 are slightly adjustably positioned in the frame 2. Members, such as screws 65, loosely extend through apertures in but engage end portions of the cylinder, or solenoid form 61 to permit slight adjustment of the position of the armature coil 59 and thus of the bore 64 therein to insure free movement of the solenoid armature to and from operative relationship with the solenoid coil. The armature 60 never contacts the cylinder 61 and thus provides quiet wear proof solenoid action which doesn't interfere with the piano playing and sounding in any manner.

The cover 21 extending over the chord playing member 5 of the piano 1 normally extends the entire length of the piano and, at a portion of the piano having the run playing mechanism associated therewith, a plurality of individual control switches 66 are positioned in transverse alignment with each other. The switches 66 extend up through a suitable slot or opening provided in the cover 21, with the actual electrical contact means for the normally open switch 66 being carried by a pair of resilient contact arms 67 and 68, as best shown in FIG. 10. The contact arms 67 and 68 are of a resilient construction so that pushing down on an insulation button 69 secured to the upper portion of each of these contact arms 67 serves to close the contact between the arms 67 and 68 temporarily and actuate a solenoid connected to and controlling playing of the key represented by each such individual switch 66. Suitable leads, described hereinafter in detail, extend from the contact arms 67 and 68 to supply energization to a given solenoid coil 59 for the solenoid of each key or keys for playing runs, arpeggios, or other piano playing actions dependent upon the energization of the proper solenoids in the run playing octaves of the piano.

*Electric control circuit*

In order to understand the exact correlation of the various features and mechanisms provided on the piano 1, reference now is made to the details of the electric control circuit provided in the piano. Referring now to the individual circuit leads required to provide actuation for a chord in the general chord control unit, represented as 5 in FIG. 12, the contact arms 37 and 38 can be considered to be switches 37a which are individually connected in the circuits for each key in the control octave. Thus individual leads 70, 71, 72, etc., FIG. 11, extend from this chord control unit 5 to the individual actuation coils of the solenoids 44 previously described. The opposite sides of each of the coils of these solenoids 44 are grounded as by a suitable connector 73 so that some of these solenoids 44 will be actuated whenever the power supply switch 41 is closed and some of the individual switches 37a previously being individually closed, as previously described, to play any one or more of the desired keys in the control octave to sound a note, or usually a chord therein.

A common power supply lead 74 also connects to the power lead 19 from the rectifier 13, and such lead 74 connects to a plurality of individual switches 75, each one of which represents one key of the control octave. These switches 75, as shown in FIG. 5, each comprise a pair of normally spaced, resilient contact arms 76 and 77 positioned immediately below each of the keys of the piano 1. The switches 75 are so positioned and arranged as to be individually closed by playing or depressing the individual keys in the control octave. A pair of leads 78 and 79; 78a, 79a, etc. connect to each one of the switches 75 and the different sets of leads 78, 79; 78a, 79a; 78b, 79b, etc. forming part of a power circuit for the musical notes indicated at C, C♯, D, etc. in the control octave in FIG. 12. It should be noted that the switches 75 can be associated with desired parts of a piano action control for a switch to be closed by actuation or playing of such key. The lead 79 in the circuit of the key C below middle C has a connector lead 80 electrically connected thereto and extending longitudinally of the piano to supply power to leads 81, 82, 83 and 84 in the energization circuits of corresponding notes, C, in the run octaves to have power supplied to the individual control circuits provided therefor whenever the key C in the control octave is played. Power flows to such leads 81 through 84 through the switch 75 and other circuit means referred to hereinbefore. Corresponding leads to those referred to hereinbefore connect the circuits for the C♯ keys, D keys, etc. to the equivalent notes in the run octave control circuits and with such corresponding leads being indicated by the numerals 80a, 80b, 81a, 81b, etc. Further tracing the circuit of the lead 81, for example, it flows through one of the enabling switches provided in a cover, or plate 21 that aid in retaining the buttons 20 in desired positions for vertical movement only thereof. Each of these buttons 20 has a vertically downwardly extending control shaft 22 extending therefrom slidably engaging a lower portion of the cover 21 and with a plurality of control fingers 23, 24, 25, 26 and 27 extending from such shaft 22. These control fingers, in turn, are adapted to engage with arms 28, 29, 30, 31 and 32, respectively, as shown in FIG. 8. Actual control of the keys in a control octave on the piano 1 is effected by means of 12 bars 33 extending parallel to each other and journalled in one portion of the chord playing member 5. Each of these bars or rods 33 represents one musical note of the 12 musical notes forming the complete control octave on the piano 1. Each of such bars 33 has a plurality of arms, like the arms 28 through 32, referred to hereinbefore, extending therefrom. These arms 28 through 32, referred to hereinabove, individually engage different control fingers on shafts, like the shaft 22, extending downwardly from each of the buttons 20. Hence, for each chord, represented by one of the buttons 20, a suitable arm or arms, like the arms 28 through 32, is secured to each one of the bars 33 representing a note to be played and extending therefrom and engageable with fingers on a shaft 22 for moving the bar 33 to which it is secured through a slight arc upon pushing down any one of the buttons 20 to play such key or keys as hereinafter described.

At longitudinally spaced portions of each of the bars 33, a control bar 34, 34a, 34b etc., see FIG. 9, is secured thereto and extends therefrom substantially normal to the longitudinal axis of the bar 33. Each of these control bars 34, 34a, etc. engages a vertically extending, reciprocal rod 35, 35a, 35b, respectively, which is slidably positioned in bores at spaced but aligned portions of a support block 36. The support block 36 is suitably operatively secured to the piano frame 2. The plurality of control bars 34, 34a, 34b, etc. are provided for controlling or actuating individual keys in the control octave represented by the individual bars 33. FIG. 9 also shows a pair of resilient contact arms 37 and 38, which normally are in spaced relationship to each other at the contacts 39 provided on the free ends thereof, that form a switch 37a positioned below the support block 36 with one pair of such contact arms 37 and 38, or equivalent, being provided for each one of the 12 bars 33 for the notes or keys in the control octave. When these contact means 39 of the switch 37a are closed by vertically downward movement of the rod 35, 35a, etc., this closes a circuit through such normally open contact arms to supply electric power to or close an electric circuit to means such as solenoids, as described hereinafter, for actual operation or sounding of the particular key represented by such bar 33 and associated control bar 34. The rods 35, 35a, etc. are each individually supported on the upper contact arm 37 therefor. All of the foregoing action is secured by the temporary depression of one of the buttons 20 so that a desired chord or key can be struck or played on the piano. Upon release of the particular control button 20, the resiliency in the contact arm 37 pulls it up and raises the rods and associated control bars 34 to in turn raise or move the bar 33 connected thereto through a slight arc and position the button 20 previously depressed back to its normal raised, or elevated position. However, these buttons 20 and their control shafts 22 may be of the type to lock automatically in their depressed positions and be readily releasable by a simple arcuate action, or by other release force and action applied thereto.

It is a novel feature of the present invention that in the normal positioning of the control finger 27 in relation to the arm 32, or equivalents in the chord playing member 5, which is at the lowest portion of the support shaft 22 on each of the buttons 20, such control finger 27 engages the arm 32 at the last portion of downward movement of the control button 20. Each of such arms 32 is secured to a special control bar 40 which is the last one of the bars to be moved through a slight arc by movement of the one button 20 downwardly. The control bar 40 is parallel to the 12 bars 33 and is journalled immediately therebelow. Such control bar 40 controls a unitary power control switch 41 provided in a power supply lead 42 that extends from the output lead 19 of the rectifier 13 to connect it to the chord playing member 5. Hence, closing this switch 41, which includes contact arms (not shown) equivalent to the contact arms 37 and 38, provides power to an internal lead 43 in the chord playing member so that as the individual switches 37a, or equivalent, in the chord playing member or unit are closed, power can be transmitted through the chord playing member to the solenoid means for the control octave keys, as described hereinafter. It should be understood that the closing of the switch 41 at the last portion of movement of a control button 20 prevents any arcing at other contact means in the chord playing apparatus and localizes any and all contact arcing or flashing action in the chord playing member 5.

Furthermore, the use of the one end, or common contact for supplying power to all of the circuits for individual keys in the control octave to be played in any given chord after the individual key circuits have been closed insures the simultaneous striking of such chord notes as a unit for most pleasant and best musical playing of the piano 1.

*Chord playing member—Electrical striking action*

Individual solenoids for actuation of the 12 keys in at least the control octave of the piano 1 are provided in association with each of such keys, and it will be realized that any desired number of keys can be controlled by the chord playing member.

As previously indicated, a solenoid 44 indicated in FIGS. 2 and 7, is provided for each of these keys in the control octave or bass notes of the piano controlled by the chord playing member. These solenoids 44 are positioned in a plurality of vertically aligned, parallel, horizontal rows on frame means 45 suitably secured to, or forming a part of the frame 2 on the piano 1. Each of the solenoids 44 has a pair of leads extending therefrom the connection to which will be described hereinafter in more detail. A solenoid armature 46 is provided in each of the solenoids and such solenoid armature 46 is slidably positioned in the solenoid coil for reciprocation therein. Some suitable lightweight connector arm or rod, such as an aluminum rod 47, is secured to the lower end of the armature 46 and with such connector, in general, being of J-shape and extending around forwardly of the solenoid 44 and the support frame 45 provided therefor up to a position adjacent a portion of the piano action means provided in the piano 1. Such piano action means are indicated by a link, or sticker 48 and a whip, or link 49 that are pivotally connected to each other and are usually made from wood, as is conventional in piano construction. The connector arm 47 preferably carries a spring finger 50 thereon extending normally therefrom and a felt pad 51 is provided on the upper surface of such spring finger so that a cushioned impact is provided on the links 48 and 49 when the solenoid 44 is energized to lift the connector 47 vertically to strike the link 49 by the felt pad 51 on the spring finger and cause the key controlled thereby to be actuated or played. The spring finger 50 and felt pad 51 form a link striking head, or a note striking means in the piano. A support bar 52 is provided immediately adjacent the lower surface of each of the spring fingers 50 and a suitable cushion or pad 53 is carried by the support bar 52 to cushion the impact of the spring finger when it and the connector arm 47 are permitted to drop down onto the support 52 by de-energization of the solenoid 44. By vertically staggering the sole- 66 and through the solenoid coil 59 connected thereto to a ground lead 85 common to the individual circuits for each of the keys in the run playing octaves of the piano. It should be noted that closing any of the individual switches 66 provided in the piano 1 where energization circuits therefor have not been provided through closing the equivalent enabling switch 75 provided in the circuit of the key in the control octave corresponding to such other key will not produce any action in the run playing key by closing the switch 66 therefor. FIG. 6 shows that the 12 common leads 80 through 80k are carried in a recess provided in the top of the frame 2 below the keys so that a minimum of wires are used and such wires are neatly positioned in a conventional piano frame.

From the foregoing, it will be seen that the person playing the piano can produce a run or arpeggios on the piano in harmony with a given chord played in the control octave by manually running his hand or fingers over all of the aligned switches 66 to depress them and temporarily close the energization circuits for keys in these various run playing octaves corresponding to the keys in the chord being played in the control octave.

Sustaining hold feature

Yet a further feature of the piano 1 is that a very unusual and striking playing effect can be provided on the piano by means of a certain apparatus for sustaining or holding a chord in the control octave of the piano while also retaining keys in harmony therewith in the other octaves of the piano energized for some time. By such apparatus, the person playing the piano can have both hands free for a strumming action on the series of contacts, or switches 66 to provide a sounding of several harmonics of a given chord at the same time to produce a harp-like effect in the playing of the piano and the tones produced therefrom.

The sustaining feature of the piano 1 includes a multi-contact control, gang, sostenuto, or sustaining switch 86. Such control switch 86 has a common plunger or shaft 87 therein with 12 longitudinally spaced contacts 88 being secured thereto and insulated therefrom. These contacts 88 are positioned to engage conventional terminal means, or contacts so as to close circuits between the various leads 79, 79a, 79b etc. which connect to the sustenuto switch 86, and corresponding leads 179, 179a, 179b, etc. in the individual power circuits of the keys in the control octave extending from the sustenuto switch 86. Thus by opening, or closing the sustenuto switch 86, 12 individual circuits are established through such control switch, or else all of such circuits are opened dependent upon whether or not a sustaining action is desired for a chord being played in the control octave. These leads 179, 179a, etc. extend from the multi-contact unitary sustenuto switch 86 to connect to the solenoid coils 44 of the various individual solenoids.

In action, initially a chord is played in the control octave by either actuation of one of the control buttons 20, or else the keys in the control octave are manually depressed or played so that the switches 75 corresponding to the keys, of such played chord, are closed. This in turn supplies power to the leads extending to one side of the contacts 88 in the sustaining switch 86 so that, if the sostenuto switch 86 and if the contacts 88 are closed, power will then flow through such contact switch to the energization coils for the solenoids 44 to the ground lead 73 to retain the solenoids 44 energized and hold any keys corresponding to the energized solenoids depressed. Such maintenance of the keys depressed in the control octave maintains power supply to the individual circuits of the keys in the other, or run playing octaves of the piano that correspond to the keys actuated or played in the control octave. As indicated, the player at the same time has both hands free for running up and down the series of the switches 66 to provide the very unusual and desirable harp-like effect in the playing of the piano 1.

As previously indicated, any desired number of the solenoids 44 can be provided to provide mechanical playing action on all of the keys in the control octave and on the keys of a bass octave for playing bass chords or individual bass keys in the piano 1.

In some instances, it may be desirable to provide energization of the leads 80, 80a, 80b, etc. by other means than the switches 75 that are operatively associated with and closed by playing the keys in the control octave of the piano. For example, such leads 80 through 80k might connect to leads 70, 71 etc. respectively, and be energized thereby by the playing of a chord through the chord control member or unit 5 of the invention. In such instance, it would be desirable to retain a given chord play button 20 in a depressed position to maintain energization of these leads 80 through 80k in the circuits thereof corresponding to the notes played in a given chord in the control octave.

Furthermore, the leads 80 through 80k could be energized through the chord playing buttons 20 by connecting the leads 70, 71, 72, etc. to the leads 80, 80a, 80b, etc., respectively, to supply power to the individual key circuits of the run playing octaves with or without any electrically actuated playing of the keys of the control octave. The solenoids 44 might be omitted in such modification, and the chord play buttons 20 preferably would stay depressed until manually raised, or released.

It should be realized that the chord playing means of the piano 1 may be separately applied thereto, if desired, and that the run playing means may comprise a separate unit but for best action and results the use of both chord and run playing means in a piano is preferred. The run playing switches 66 and octave coupler means could be assembled as a unit that could be attached to a base part of the front of the frame 2, or could rest on the floor so that the player could produce runs or arpeggios by one of his feet and still have both hands free for piano playing action. Such switch unit could even be made adjustable to be placed on the piano at the front of the keyboard as shown in the drawings, or to be placed on the floor for playing keys 221 by foot as shown in FIG. 15.

It will be realized that the links 48 and 49 are a part of a conventional piano action means, as previously referred to herein, and extend up to and are controlled by, or control actuation of one of the keys 3 or 4 of the piano. The link 49 may extend directly to and control, or be what is called the whip portion of the piano action.

Note that the chord playing buttons 20 can have suitable indentification means provided thereon or suitable marts can be provided in association with such chord playing keys for identifying the chord or key played by an individual chord playing button 20. Usually one row of bass buttons, second from back, plays the tonic or first degree of the scale. The adjacent bass note in the first row next to the piano frame plays the third degree of the scale making possible the convenient playing of chromatic scales in the bass. In general, the keyboard and notes played by the individual buttons 20 are the same as those played on standard accordion keyboards. However, by varying the positioning and number of the fingers 23, 24, etc. on the shafts 22, any desired chord or key may be played by any button.

It will be realized that the piano 1 of the invention can be used in a conventional manner, or the player may merely play the melody of a song with his right hand in the usual manner. Then with his left hand, the player may provide the accompanying chord harmony or bass harmony by use of the chord playing means or member 5. The proper chord button 20 can be selected by referring to the chord symbols which are usually provided on sheet music as printed today. It is therefore unnecessary to read the left hand bass staff notes on the music sheet.

Playing the piano 1 of the invention is not entirely a mechanical operation such as one has or uses when pumping or playing a player piano, or playing a phonograph, as the performer may select the harmony and chords that he desires to use, and he normally must play the melody with his right hand. Hence knowledge of the fundamentals of music is desirable and the learning of such fundamentals of music is facilitated by playing the piano of the invention and realizing the action produced by given chords. Furthermore, the player can close the sustaining switch 86 and obtain the very unusual harp-like effect at any desired time by running both hands up and down the series of aligned keys 66 when an unusual run or hold action is desired in the piano. Hence, the player can really achieve a true feeling of creativeness and he secures a feeling of accomplishment but he can secure very desirable and effective piano playing action without the usual painstaking hours of practice and fingering, and the hours of study of chord construction as are required in the playing of a completely conventional, manually actuated piano.

Twelve additional leads 89, 90, 91, etc. are shown connecting to and extending from the chord control or play unit shown in FIG. 11. These leads 89, 90, 91, etc. extend to the coils of the solenoids 44 for controlling the individual notes in the bass octave of the piano. Preferably the individual control circuits for each of these keys in the bass octave are directly closed by means of the individual push buttons 20 and the control shaft 22 secured thereto. Thus, FIG. 14 of the invention shows a fragmentary view of how the lower end of the shaft 22 for the bass control buttons can directly engage a spring contact arm 92 to force such contact arm 92 down into engagement with a similar contact arm 93 positioned thereadjacent. Hence, a circuit can be directly closed to one of the leads 89, 90, 91 by the individual switch means indicated by the numeral 94 and made from individual pairs of the contact arms 92 and 93 provided in the energization circuit for each of the bass playing keys in the chord control member 5. A typical switch 94, such as is diagrammatically illustrated in FIG. 11 thus is provided in each energization circuit for a bass note.

FIG. 9 shows that an adjustment stud 95, or equivalent can be positioned in a lock nut 96 suitably secured to the piano frame 2 immediately adjacent and below the spring contact arm 38. By adjusting the position of the stud 95, the setting of the switch 37a can be varied and proper closing action thereof can be obtained by a limited vertical movement of the control shaft 22 in association with such switch for a positive switch closing action to play a selected bass key.

It should be realized that if only one key is to be played by the contact buttons 20 in the chord playing member 5 of the invention, then it would not be necessary to connect the circuits for such individual key energization circuits through the common power supply switch 41 provided in the apparatus and only one control finger would need to be provided on the particular shaft 22 for such bass note playing button. Twelve bars, like the bars 33, and similar associated means, as is conventional in accordion controls, may be provided to actuate the bass keys, if desired.

A plurality of foot pedals 196 can be provided on the piano 1 and they can be used for their conventional actions in the piano, or one of these pedals can be used to provide a control for the sustaining control switch 86 which normally is spring actuated to snap it to an open position when any pressure applied thereto is withdrawn.

Hence, FIG. 16 shows a fragmentary vertical section of the piano 1a that has a sostenuto switch 386 provided therein. In this instance, a piano action foot pedal 396 is shown to control the operating rod 287 in this switch 386 for controlling a plurality of switches, or contacts 288. These switches 288 operate as a unit and control the connections between leads 279 and 379, 279a and 379a, etc. which leads and connections corresponds to the leads and connections 79, 79a, 79b and their association with the leads 179, 179a, 179b, etc. as shown in FIG. 12.

It will be realized that any desired springs can be assembled in association with the control shafts 22 to aid in returning the chord control buttons to inoperative positions. In some instances, the solenoids 44 could be smaller in size, like the solenoids 59 shown for use in the run playing mechanism of the piano 1. Thus, these solenoids 44 would then be positioned, in the manner as the solenoids 59, directly in recesses provided in the frame 2 for the piano 1. As indicated, the armatures 60 for the solenoids 59 are secured in any suitable manner to the keys 3 and 4 and extend therefrom at least substantially perpendicular to the longitudinal axis of the key.

While FIG. 7 shows one manner in which the solenoid actuating means of the invention can be positioned to strike a portion of the piano action members for effecting key operation, it should be realized that other contacts can be made with the piano action mechanism for producing a piano key playing action. It also should be realized that the connector rods 47 as shown in FIG. 7 preferably are received in slots or other retaining means (not shown) in the upper shelf 52 of the frame 45 to retain such connector rods in desired vertically extending positions with limited lateral movement thereof. Of course, the solenoid 44 is adapted to pull the solenoid armature 46 vertically upwardly from the position shown in FIG. 7 when such solenoid is energized to produce key striking action.

In general, it will be seen that the playing of the chord control keys in the control octave will enable one to play a desired run in harmony with such chord by the means shown. It also should be understood that the notes in the bass octave played by the use of the chord control buttons may either be musically immediately next to the note ending the lowest portion of the control octave, or else such bass notes and octave could be spaced several keys or more on the keyboard away from such control octave.

A conventional several position switch, indicated at 97, may be provided in an exposed portion of the piano 1 to control the particular one of the switches 16, 17 or 18 which is closed to control the loudness of the tone output from the piano 1.

FIG. 4 of the drawings shows some of the leads 82, 82e, 82f, etc. that are used in the invdual circuits for the run playing solenoids 59, but other of such leads are not shown to avoid complexity in the drawing.

FIG. 10 and 13 of the drawings best show certain details of a further feature of the invention comprising a novel octave coupler provided in the piano of the invention. A non-conductive contact bar 98 is shown slidably positioned in a support arm or bracket 99, one of which is positioned adjacent each end of the bar 98 that extends the length of the row of the contacts 66. At each end of this bar 98, a solenoid armature 100 is secured to the bar and it is operatively associated with a solenoid coil 101 operatively carried by the piano frame 2 so that these solenoids, indicated by the numeral 102, when energized, will pull the contact bar 98 up against the lower ones of all of the contact arms 68 to force them against the contact arms 67 and close these switches. Hence, at such time when any playing is performed, or provided on the control octave, the switches 75, which are operatively associated with the individual keys of the control octave in any suitable position to be closed by the playing of their control key, will immediately energize corresponding keys in all of the various run playing octaves in the piano. By use of the electric circuit means of the invention and the unitary multiple circuit closing member or bar 98, I can, for example, play melodies in the control octave manually and obtain a simultaneous playing of the melody in the various other octaves in the run portion of the apparatus so that yet another desirable playing feature is provided in this piano of the invention.

The solenoids 102 may have a direct power control switch 103 provided therefor, as shown in the wiring diagram in FIG. 12, so that closing such switch 103 will effect actuation of the solenoids 102 and permit and provide coupled octave playing melody in the piano, as described.

The term "harmony" is broadly used in the specification and claims to cover notes differing by an octave as well as other combinations of consonant notes.

In view of the foregoing, it is believed that all of the objects of the invention have been achieved by the novel piano of the invention described hereinbefore.

While one complete embodiment of the invention has been disclosed herein, it will be appreciated that modification of this particular embodiment of the invention may be resorted to without departing from the scope of the invention as defined in the appended claims.

What is claimed is:

1. In a piano, the combination comprising a plurality of individual note playing means, a plurality of electrically energizable means severally operatively associated with said note playing means and each of said electrically energizable means when energized being arranged to actuate the corresponding one of said note playing means, a source of electrical energy, and a plurality of individual sostenuto circuit means severally connected to said source and electrically energizable means and collectively including normally open gang switch means selectively closeable, said gang switch means having no mechanical connection to said individaul note playing means and being actuated independently thereof, said note playing means severally controlling the connections of said circuit means with said source, whereby actuating one of said note playing means to play a note and when said gang switch means is closed cooperate to maintain the corresponding one of said electrically energizable means energized to sustain said note.

2. In a piano, the combination comprising a plurality of individual note playing means, a plurality of electrically energizable means severally operatively associated with said note playing means and each of said electrically energizable means when energized being arranged to actuate the corresponding one of said note playing means, a source of electrical energy, and a plurality of parallel individual sostenuto circuit means severally connected to said source and electrically energizable means and collectively including normally open gang switch means selectively closeable and severally including normally open enabling switch means aranged in series with said gang switch means and being closed upon actuation of the corresponding one of said note playing means to supply power to said gang switch means, whereby actuating a number of said note playing means and closing said gang switch means cooperate to maintain the corresponding ones of said electrically energizable means energized to sustain said notes.

3. In a piano, the combination comprising a plurality of individual note playing means, a plurality of electrically energizable means severally operatively associated with said note playing means and each of said electrically energizable means when energized being arrarnged to actuate the corresponding one of said note playing means, a source of electrical energy, a plurality of individual chord circuit means severally connected to said source and electrically energizable means and being arranged to energize certain of said electrically energizeable means and actuate the corresponding ones of said note playing means, and a plurality of individual sostenuto circuit means severally connected to said source and electrically energizable means in parallel with said chord circuit means and being arranged to maintain said certain electrically energizable means energized upon actuation of the corresponding ones of said note playing means.

4. In a piano, the combination comprising a plurality of individual note playing means, a plurality of electrically energizable means severally operatively associated with said note playing means and each of said electrically energizable means when energized being arranged to actuate the corresponding one of said note playing means, a source of electrical energy, a plurality of individual chord circuit means severally connected to said source and electrically energizable means and severally including normally open individual power completion switch means for each electrically energizable means and collectively including a common power supply switch means in series with said individual switch means and selectively operable means for closing said common switch means after closing certain of said individual switch means to simultaneously energize certain of said electrically enenergizable means and actuate the corresponding ones of said note playing means, and a plurality of individual sostenuto circuit means severally connected to said source and elecrtically energizable means and collectively including normally open gang switch means selectively closeable and severally connected in parallel with said chord circuit means, said note playing means severally controlling the connections of said sostenuto circuit means with said source, whereby selectively operating said closing means to simultaneously actuate a number of said note playing means to play a chord and closing said gang switch means cooperate to maintain the corresponding ones of said electrically energizable means energized to sustain said chord.

5. In a piano, the combination comprising a plurality of individual note playing means, a plurality of electrically energizable means severally operatively associated with said note playing means and each of said electrically energizable means when energized being arranged to actuate the corresponding one of said note playing means, a source of electrical energy, a plurality of individual chord circuit means severally connected to said source and electrically energizable means and severally including normally open individual power completion switch means for each electrically energizable means so that closing certain of said individual switch means energizes certain of said electrically energizable means and actuates the corresponding ones of said note playing means, and a plurality of individual sostenuto circuit means severally connected to said source and electrically energizable means and collectively including normally open gang switch means, closable separately of actuation of said note playing means, selctively closeable at any time and severally connected in parallel with said chord circuit means, said note playing means severally controlling the connections of said sostenuto circuit means with said source, whereby selectively operating said individual switch means to actuate a number of said note playing means to play a chord when said gang switch means is closed maintains the corresponding ones of said electrically energizable means energized to sustain said chord.

References Cited by the Examiner

UNITED STATES PATENTS

| 1,603,871 | 10/1926 | Sandell | 84—21 X |
| 1,665,593 | 4/1928 | Klein | 84—442 X |
| 1,801,488 | 4/1931 | Cooper | 84—245 X |
| 1,811,076 | 6/1931 | Cooper | 84—1.08 X |
| 1,831,734 | 11/1931 | Arostegui | 84—425 |
| 2,203,432 | 6/1940 | George | 84—1.19 |
| 2,645,968 | 7/1953 | Hanert | 84—1.22 |
| 2,697,959 | 12/1954 | Kent | 84—1.26 X |
| 2,919,619 | 1/1960 | Munzfeld | 84—443 |

FOREIGN PATENTS

| 228,608 | 2/1925 | Great Britain. |

LEO SMILOW, *Primary Examiner.*

LEYLAND M. MARTIN, *Examiner.*